March 24, 1936.    H. NYQUIST    2,034,826

MODULATOR FOR ALTERNATING CURRENTS

Filed Aug. 22, 1933    2 Sheets-Sheet 1

INVENTOR
*H. Nyquist*
BY
ATTORNEY

March 24, 1936.  H. NYQUIST  2,034,826

MODULATOR FOR ALTERNATING CURRENTS

Filed Aug. 22, 1933   2 Sheets-Sheet 2

INVENTOR
H. Nyquist
BY
ATTORNEY

Patented Mar. 24, 1936

2,034,826

UNITED STATES PATENT OFFICE 2,034,826

MODULATOR FOR ALTERNATING CURRENTS

Harry Nyquist, Millburn, N. J., assignor to American Telephone and Telegraph Company, a corporation of New York Application August 22, 1933, Serial No. 686,305

12 Claims. (Cl. 179—171)

This invention relates to modulation and demodulation of alternating currents of different frequencies, and its object is to make use of modulators of the third order, that is, of circuit elements in which there is present a component of current proportional to the cube of the impressed voltage.

Heretofore extensive use has been made of modulation elements of the second order, the theory and practice having been especially developed in connection with vacuum tubes operated under conditions to bring out the second order terms. While these have great utility, there are certain disadvantages which are present and which may be overcome in part by third order modulation elements.

In all modulation circuits there appear certain modulation products which are undesirable, and it becomes important to eliminate them. At times this may be done by tuned circuits and at times by balancing. The purpose of this invention is to so combine a plurality of third order modulator elements as to form a balanced modulator circuit, or one in which undesired terms will balance out.

Another purpose of the invention is to accomplish the above with a minimum number of modulator elements. Still another purpose is to so choose and relate the plurality of elements that first and second order terms will be absent, thus yielding a pure third order modulator circuit. Still another purpose is to accomplish these results with modulator elements which are passive and thus more stable than is the case with the usual vacuum tube modulators which require sources of power for filament and for plate circuits, all subject to numerous fluctuations.

Figure 1:
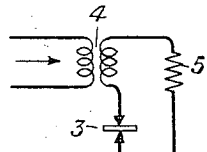
Figures 2A, 2B:
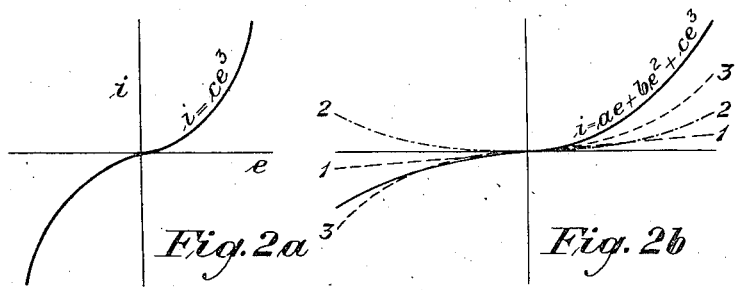
Figure 3:
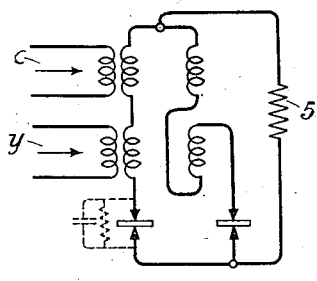
Figure 5:
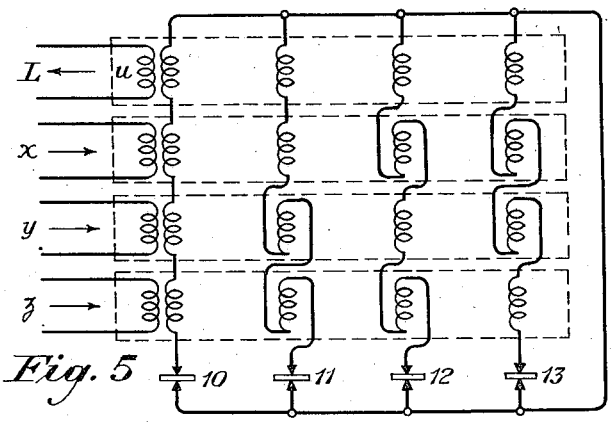
Figure 4:
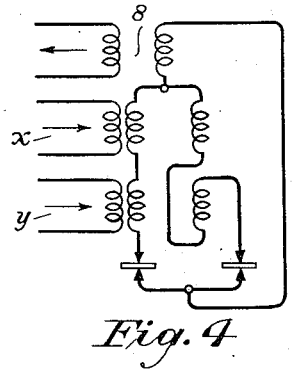
Figures 6, 7:
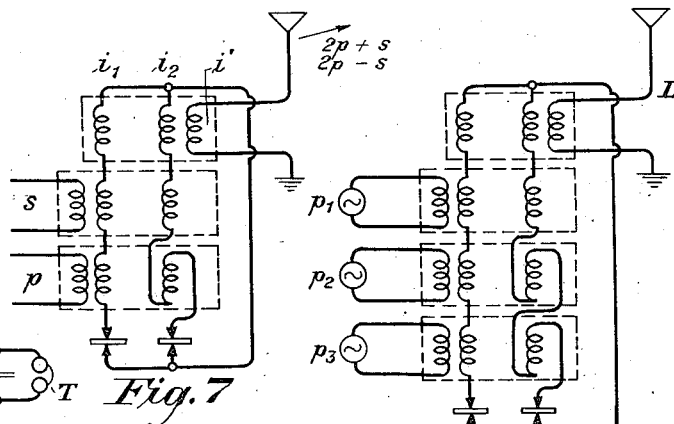
Figure 8:
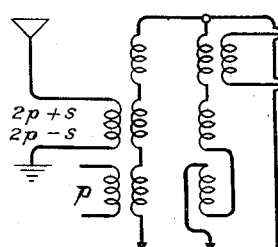
Figure 9:
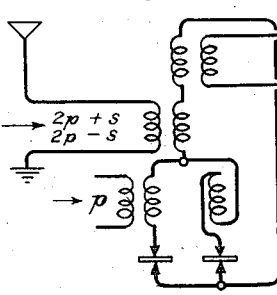
Figure 10:
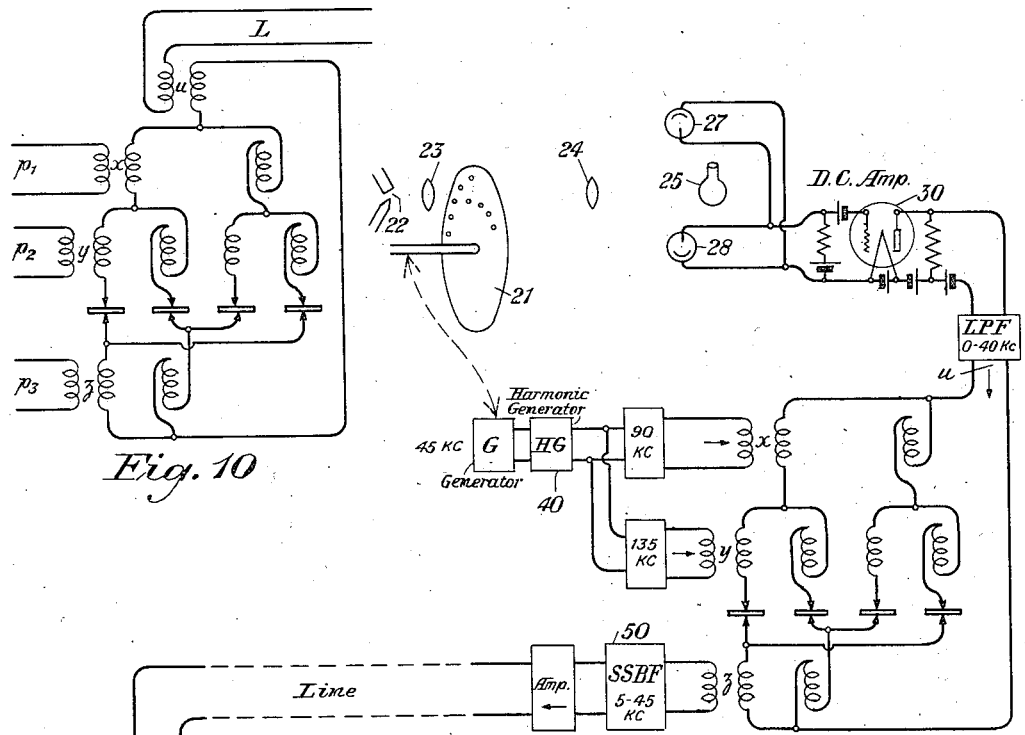
Figure 11:
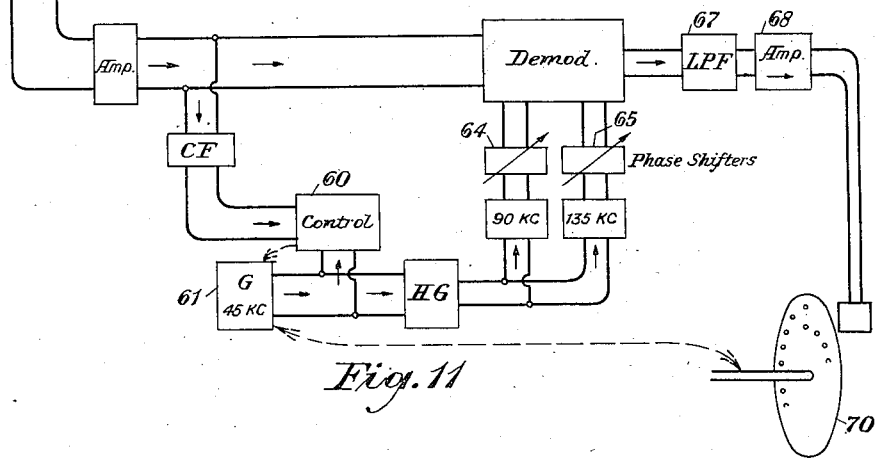

The invention will be better understood by reference to the following specification and accompanying drawings in which Figure 1 shows a circuit for a single modulator element; Figs. 2a and 2b show the volt-ampere characteristics of typical modulator elements adapted for use in this invention; Fig. 3 shows a circuit of two modulator elements adapted for balancing out certain modulator components, and Fig. 4 is a modification thereof; Fig. 5 shows a circuit comprising a larger number of modulator elements whereby more complete balancing out of undesired components is made possible; Fig. 6 shows the application of a modulator of the form shown in Fig. 3 at a transmitting radio or other station, and Fig. 7 is a simplified modification thereof; Figs. 8 and 9 are corresponding applications of this modulator as a detector or demodulating circuit; Fig. 10 shows the application of the more complete modulator unit of Fig. 5 to either a transmitting or a receiving circuit; and Fig. 11 shows one specific illustration of the use of my invention to a television system comprising both the transmitting and the receiving ends.

Referring more specifically to Fig. 1, there is shown an element 3 in series with the secondary of a transformer 4 and a load 5. The element 3 may be any one of a variety of forms of non-linear devices but preferably one of such characteristic that the current flowing through it is directly proportional to the cube of the voltage impressed across the element 3. A typical characteristic is shown, for example, in Fig. 2a. Such an element has the property that its characteristic is made up of or has a pronounced third order term and such modulators are usually highly symmetrical, which means that even order terms, including the second and fourth, are relatively weak. While there are a number of materials possessing such properties, one which I have found particularly suitable for this purpose is that known in the art as "Thyrite", or materials of the nature described in patent to McEachron, 1,822,742, September 8, 1931. However, it is to be understood that this invention is not limited to the use of thyrite or any other specific substance.

It will be observed that the characteristic of Fig. 2a is symmetrical with respect to the coordinate axes, and its equation is of the form:

$$i = ce^3,$$

where $e$ is the voltage impressed across the element. This is not necessarily true of all such elements as I may wish to use, for the characteristic may be more nearly like that shown by the full line of Fig. 2b in which the characteristic is made up of three components and is given by the equation:

$$i = ae + be^2 + ce^3,$$

the portions being represented in Fig. 2b by the curves 1, 2 and 3, respectively. While elements of this character may be used in my invention it is desirable, as will be pointed out later, that a plurality of elements of this kind shall be so combined that the first and second order terms balance out. Many elements will have higher order terms present in their characteristic, but for the purposes of discussion it will be sufficient to assume that the modulator element may be represented by three terms, as follows:

$$i = ae + be^2 + ce^3.$$

The voltage $e$ applied to such a modulator element may be made up of two components $x$ and $y$, each of which may be sinusoidal, the two in general being of different frequencies corresponding to $p_1$ and $p_2$ where $p$, in this place as elsewhere throughout this specification, will be taken to represent the angular frequency, that is, $2\pi$ times the frequency of a sinusoidal variation. Such a composite voltage may be impressed on the primary of transformer 4 of Fig. 1, in which case certain modulation components appear in the load 5. As stated above, however, it is desirable that certain of these modulation components shall be balanced out and a step towards doing this is shown in Fig. 3, where two modulation elements are connected in parallel with separate transformers to supply the two components $x$ and $y$ to the elements and arranged as shown with one winding of one transformer reversed. Under these conditions there will appear certain modulation products in the load 5 with certain of the components which were present in Fig. 1 being absent due to balancing out in a manner to be more fully described hereinafter. Fig. 4 is a modification of Fig. 3, in which the load circuit is connected through transformer 8. It is apparent from inspection that the two secondary windings of the transformer receiving the component $x$ may be combined into a single winding, but this would not be true of the transformer receiving the component $y$.

While the circuits of Figs. 3 and 4 balance out certain modulation components, such balancing out is not carried as far as is desirable in many cases, and a further step in this direction is shown in Fig. 5 in which the impressed electromotive force is made up of three sinusoidal components $x$, $y$ and $z$. In this case I find it desirable to use four modulation elements in parallel, each supplied with voltage of the three components but with a reversal of phase of certain of the components in a manner and for a purpose to be hereinafter described.

Referring to Fig. 5, the voltage impressed on the element 10 is given by $$e = x + y + z,$$

and the current flowing as a result through the element 10 is given by $$i_{10} = (x + y + z)^3.$$

Upon expansion we find:

$$i_{10} = x^3 + y^3 + z^3 + 3x^2y + 3x^2z + \\ 3y^2x + 3y^2z + 3z^2x + 3z^2y + 6xyz \quad (1)$$

It will be noted that there is only one term containing all three components, or more precisely, there are six such terms but they are equal and add up. This term possesses the property that it can be isolated from all the others by balance, as will be apparent from what follows. If the element 11 is associated with the input transformers in such a manner that two of the transformers have the secondary reversed, then the current flowing through 11 will be given by:

$$i_{11} = (x - y - z)^3 \quad (2)$$

$$= x^3 - y^3 - z^3 - 3x^2y - 3x^2z + 3y^2x - \\ 3y^2z + 3z^2x - 3z^2y + 6xyz \quad (3)$$

If these two currents $i_{10}$ and $i_{11}$ are now combined additively into the load L, it will be observed that certain of the terms will cancel each other, with the resulting current:

$$i' = 2x^3 + 6y^2x + 6z^2x + 12xyz \quad (4)$$

Furthermore, if two additional branches 12 and 13 are included in parallel with 10 and 11 and in such manner that the voltage impressed on 12 is equal to $(-x+y-z)$ and on 13 is equal to $(-x-y+z)$, then it can be shown in an exactly similar way that the resultant of these circuits in the load is given by:

$$i'' = -2x^3 - 6y^2x - 6z^2x + 12xyz \quad (5)$$

whereupon it is seen that the combined result of all four branches is:

$$i = i' + i'' = 24xyz \quad (6)$$

Thus it is seen that the combination of four third order modulators associated in the manner of Fig. 5 will bring about the balancing out of all modulation products except the one third order term contains all three components, i. e., the term $24xyz$.

Of course it will be understood that this balance will not, in general, be perfect because the four elements employed are not identical. To the extent, however, that the elements can be made identical this balance is perfect. The next step, then, of using eight elements need not be considered and in what follows the only number of elements considered will be four or less, although it will be understood that at times it may be desirable to go to a larger number of elements, the details of such a circuit being worked out in a manner which is now obvious from the description given above.

Bearing in mind that the modulator elements as originally obtained will not be identical and may possess first and second order terms, information is now given as to procedure for obtaining a balanced modulator unit. First a number of elements are selected which are approximately alike in their physical properties and dimensions; then a resistance value is selected which is preferably equal to the minimum resistance among the elements. Next measurements are made on each element in a D. C. bridge and there is then connected to each element a metallic resistance, in series or in parallel but preferably in parallel, which will make it accurately equal to the value selected. The elements are then balanced as far as first order effects ahe concerned. As for the square term, $be^2$ of the characteristic, this term is usually small to begin with in such elements as I propose to use, such as "Thyrite". Moreover, it may be effectively changed in sign by simply reversing the polarity of the elements and this reversal has no effect on the odd order terms. The magnitude and the sign of the coefficient $b$ can be determined for each of the four elements to be used in a modulator and they can be poled with respect to each other, in a balancing relationship. To do this each element is given an arbitrary polarity marking, that is, one of its terminals is marked with a plus sign. The device for measuring the second order term may consist of a source of a single sine wave connected in series with the element and a D. C. meter. Under these conditions there will in general be a D. C. component generated in the element which can be measured on the meter and which is a measure of the magnitude and sign of the square term. Having thus measured the various elements they are then arranged in groups of four for the production of a balanced modulator such as shown in Fig. 5, the elements being so selected and so poled that the second order terms balance to the extent required.

It is desirable that the coefficient $c$ of the third order term shall be the same for all the four elements of Fig. 5 in order to obtain what may be called third term balance. The simplest procedure is to measure the third order coefficient for each element and to associate such elements as measure substantially the same. A suitable device for measuring the third order coefficient consists of a source of two sine waves in series, one of which $f_1$ is nearly but not quite twice the frequency $f_2$ of the other. Under these conditions the element delivers a modulation component of frequency equal to $[f_1-2f_2]$ and this frequency may be made sufficiently low so as to operate a reasonably fast D. C. meter. The magnitude of the coefficient $c$ will then be proportional to the meter deflection.

As an illustration of the application of this invention reference may be made to Fig. 6, in which a two-branch modulator is shown adapted to receive three input frequencies corresponding to $p_1$, $p_2$ and $p_3$. In this case one or more of these frequencies may be of radio frequency and one may be of a message frequency corresponding to a speech signal, and the whole may be adapted to feed into an antenna system or carrier frequency transmission line. Under these circumstances the output to the load or line L is represented by equation (4), in which $x$, $y$ and $z$ are input waves of $A_1 \cos p_1 t$,
$A_2 \cos p_2 t$ and
$A_3 \cos p_3 t$.

Upon substitution of these values for $x$, $y$ and $z$ in equation (4) and upon analysis in the manner now well understood in the art, it will be found that the modulation products capable of impression upon the load L comprise terms of frequencies corresponding to the following:

$p_1$
$3p_1$
$p_1+2p_2$
$p_1-2p_2$
$p_1+2p_3$
$p_1-2p_3$
$p_1+p_2+p_3$
$p_1+p_2-p_3$
$p_1-p_2+p_3$
$p_1-p_2-p_3$

The result is capable of wide variation depending upon the relationships between the frequencies $p_1$, $p_2$, and $p_3$, and these may be chosen to give great simplification and useful results in the output. Thus if $p_3$ corresponds to a speech message of frequency $S$ and $p_1=p_2=p$, then it will be seen that the modulation terms above simplify to the following:

$$p, \ p\pm 2S, \ 3p, \ 2p\pm S, \ S \qquad (7)$$

and it will be observed that the two components $2p+S$ and $2p-S$ comprise the two modulation sidebands without the carrier frequency. It will be also noted that these components are widely separated from the other modulation components in a manner which is highly desirable.

As another illustration of this same circuit we may have the following arrangement:

$$p_1=p, \ p_2=2p, \ p_3=S$$

In that event it will be found that the modulation products consist of the following:

$$p, \ p\pm S, \ p\pm 2S, \ 3p, \ 3p\pm S, \ 5p$$

Thus by suitable tuned circuits one may obtain a carrier frequency $p$, with the sidebands $p\pm S$ and with the undesired distortion sidebands $p\pm 2S$. Well removed from this group of frequencies will be another carrier frequency $3p$ with its sidebands $3p\pm S$ and without the additional disturbing sidebands. Still other and numerous combinations can be obtained in a manner which now should be clear to any one skilled in the art, the examples given being for illustrative purposes only.

A simplification of the circuit of Fig. 6 is permissible and useful under certain conditions, this being shown in Fig. 7. If, for instance, as in Fig. 6 the speech signal corresponds to $p_1$ and then, as in previous illustrations $p_2=p_3$, the transformers corresponding to the frequencies $p_2$ and $p_3$ may be combined into a single transformer as shown in Fig. 7, inasmuch as the windings of the two transformers are connected in the same manner. In this event we get the following relationships:

$$i_1=(x+y)^3$$
$$i_2=(x-y)^3$$
$$i'=i_1+i_2=2x^3+6xy^2$$

If $x=\cos St$ and $y=\cos pt$, where the amplitude coefficients have been omitted or taken as unity for simplicity, it readily appears that the modulation products consist of:

$$S, \ 3S, \ 2p+S, \ 2p-S$$

Thus there are available the two modulation sidebands on the carrier frequency $2p$ with the carrier frequency absent, this being a condition desirable in certain signaling systems.

While emphasis in the applications thus far has been on transmitting stations in which, in general, it is desired to modulate some carrier frequency with a message frequency, this device may be used in the reverse manner, that is, as a demodulator or detector. This, for instance, is illustrated in Fig. 8 in which there may be received such a wave as that given out by Fig. 7, namely, the two sidebands of a carrier frequency $2p$. If there is locally generated a frequency $p$ and this is impressed on the circuit in the manner shown in Fig. 8, the modulation products can be readily obtained in the same manner as was done in connection with the circuit of Fig. 7, and it will be found that these demodulation products consist of the signal frequency $S$ plus high frequency components. If $S$ is of speech frequency it may be supplied to a suitable telephone T, which in turn may be shunted by a condenser to by-pass the high frequency components.

Fig. 9 shows a simplification of Fig. 8 for it will be obvious that the two secondary windings of two of the transformers may be combined into a single winding, as shown in Fig. 9.

Thus far the illustrations have all related to modulator devices of two branches in which there is only partial balancing out of certain undesired components. A preferred form of my invention is that in which this balancing out is carried to a further extent, as illustrated and explained in connection with Fig. 5. An application of this form of the device is shown in Fig. 10, which is a simplified modification with the transformer windings reduced to a minimum, combinations being made in a manner which will be clear upon comparison of Fig. 5 with Fig. 10. The circuit of Fig. 10 may be considered as a portion of a transmitting system or a receiving system, the load L in the first case being a transmission line or a radiating antenna, and in the other case being a suitable receiving device such as a telephone receiver. If three input waves $x$, $y$ and $z$ of frequencies corresponding to $p_1$, $p_2$ and $p_3$ and of amplitudes $A_1$, $A_2$ and $A_3$, are impressed on the transformers, the sole modulation product will be the term proportional to $$xyz = \frac{A_1 A_2 A_3}{4}[\cos(p_1+p_2+p_3)t + \cos(-p_1+p_2+p_3)t + \cos(p_1-p_2+p_3)t + \cos(p_1+p_2-p_3)t] \quad (8)$$

It can readily be shown that the four pairs of terminals of Fig. 10 and also of Fig. 5 are interchangeable, as far as third order effects go. In other words, it is possible to permute $u$, $x$, $y$ and $z$ without changing the third order modulation products. In the case of even order modulation products it may be necessary, in case of such permutation, to reverse some of the elements. More particularly, it is permissible to interchange the output $u$ with any one of the other three, and this property is of special importance in case the signalling wave extends all the way to zero frequency. Zero frequency, of course, is not transmitted through a transformer but in the case of the transformer shown at $u$ it is evident that the transformer is really unnecessary because none of the windings is reversed with respect to the others and the transformer may, therefore, be replaced by a conductive connection, as will appear in connection with the description of Fig. 11. If $p_1$ corresponds to the signaling wave, say of a speech signal, the result of the above equation may be expressed by saying that there are four sidebands, one symmetrical pair about $p_2+p_3$ and another symmetrical pair about $p_2-p_3$.

As an illustration, let the signaling wave occupy the range from zero to 2000 cycles, and let it be required to obtain the lower sideband with respect to a carrier of 2000 cycles. It is obvious that the oscillator frequencies must be such that $f_2-f_3=2000$, or $f_2+f_3=2000$, or both, where the $f$'s are, respectively, frequencies of value $p$ divided by $2\pi$. The last alternative may be secured by making $f_2=2000$ and $f_3=0$. The alternative of $f_2+f_3=2000$ is not available on account of interference from the sidebands about $f_2-f_3$. The alternative $f_2-f_3=2000$ is available provided $f_2+f_3$ is made great enough so that the sidebands with respect to it do not cause interference. This requires that $f_2+f_3=4000$, and if we choose $f_2>f_3$ we have $f_3=1000$ or $f_3=0$ and $$f_2-f_3 \gtreqless 2000$$

for the available frequencies.

The above is one illustration of the use of Fig. 10 as a modulating circuit, but the same circuit may be used for a demodulator. Thus, if an incoming wave of the two sidebands $p \pm S$ is impressed at $p_1$, and if a locally generated frequency of $p$ is impressed at $p_2$, and $p_3$ is made equal to zero, then it can be readily shown that the modulation output consists of the signal S accompanied by the high frequency terms $2p \pm S$ which would ordinarily be discarded.

Fig. 11 shows another application of a completely balanced type of my modulator to a television system in which most of the parts are shown in schematic form, this being considered sufficient for explaining the invention to those skilled in the art. At the transmitting end a scanning disc 21 is associated in the usual manner with a source of light 22 and lenses 23 and 24 to throw light on some object 25. Photoelectric cells 27 and 28 adjacent to the object 25 impress a varying current on an amplifier system 30. The requirements of television are such that the resulting fluctuating current may be well represented in a frequency band extending from zero to 40 kilocycles. This is impressed directly as here shown, upon the modulator at the point $u$. In addition there is impressed on the modulator through the transformers at $x$ and $y$ two carrier frequencies which, in this case, are taken as 90 kilocycles and 135 kilocycles, these being obtained in any suitable manner such, for example, as being derived as the first and second overtones of a generator whose frequency is 45 kilocycles, the overtones being obtained by means of a harmonic generator 40 in a manner well known in the art. By applying the modulation relationships explained above, the modulation products delivered to the transformer $z$ can be obtained and it will be found that among this group there is a band of frequencies extending from 5 to 45 kilocycles and corresponding to a sideband $p-S$, where $p$ is the carrier frequency 45 kilocycles and S is the frequency band coming from the photoelectric cells. This sideband may be passed to the transmission line to the exclusion of other modulation products by means of a single sideband filter 50 such as that described in my Patent No. 1,748,186, February 25, 1930. Upon suitable amplification this sideband may be impressed upon the transmission line and carried to the receiving station. Here a generator of carrier frequency 45 kilocycles supplies, through a harmonic generator, the frequencies of 90 kilocycles and 135 kilocycles, the frequency of the generator 61 being controlled by some suitable device 60 as described in my Patent No. 1,647,192, November 1, 1927. The message sideband is impressed on one of the pair of terminals of the modulator serving now as a demodulator, and the frequencies of 90 kilocycles and 135 kilocycles are also impressed thereon through suitable phase shifting devices 64 and 65. Again, analysis of the modulation products will show a band of frequencies extending from zero to 40 kilocycles and corresponding to the output of the amplifier 30. By means of a low-pass filter 67 this desired band may be passed on to the amplifier 68 to the exclusion of all the other modulation products. The output of the amplifier 68 may now be associated with a scanning disc 70 corresponding to the one at the sending end, all in a manner now well understood in the art.

While this television circuit has been described solely for the purpose of giving an illustration of the operation of my new modulator or demodulator, it is well to call attention at this place to the fact that the purpose of the modulation and demodulation steps in this television circuit is to lift the original frequency band extending from zero to 40 kilocycles to some more appropriate region, such as 5 to 45 kilocycles, thus avoiding the transmission over the line of currents of zero and other low frequencies. These latter would go through the line with difficulty only.

Thus far no special reference has been made to the higher order terms which may be present in the characteristic of the modulator elements. The effect of these, if present, may be kept low by working the modulator elements over a relatively small portion of their characteristic. This means that the first order effect, if present, is likely to be large in comparison with the third order effect, and this in turn means that a high degree of balance for the first order effect may be required. This latter, however, is quite readily attained since the resistances of the various elements may be adjusted to the same value with very high accuracy.

In the event that the modulators are worked over such a range that consideration must be given to the higher order terms, then it is desirable to choose the frequencies such that the higher order terms fall outside the used range so far as such choice makes that possible. In considering higher order terms it will be assumed that even order terms are negligible and also those odd order components which are balanced by the modulator. The $k$th term of the characteristic is given by:

$$e^k = (lx + my + nz)^k, \qquad (9)$$

where $k$ is odd and the coefficient has been omitted, and where $l$, $m$ and $n$ are $+1$ or $-1$ depending on whether the transformer winding is direct or reverse connected. Expanding this becomes $$\Sigma (lx)^{k_1}(my)^{k_2}(nz)^{k_3} \qquad (10)$$

where $$k_1 + k_2 + k_3 = k \qquad (11)$$

An inspection of Fig. 1 shows that these terms are not balanced if $k_1$, $k_2$, $k_3$ are all odd but are balanced if at least one of them is even. When they are all odd the frequencies appearing in the output due to the $k$th order term are:

$$[h_{11}f_1 + h_{12}f_1 + \ldots + h_{1k_1}f_1$$
$$+ h_{21}f_2 + h_{22}f_2 + \ldots + h_{2k_2}f_2$$
$$+ h_{31}f_3 + h_{32}f_3 + \ldots + h_{3k_3}f_3] \qquad (12)$$

where the quantities $h_{11}$, etc., independently take the values $+1$ and $-1$, and where $$k_1 + k_2 + k_3 = k \text{ and where} \qquad (11)$$

$$k_1, k_2, k_3 \text{ are all odd.} \qquad (13)$$

For example, for the fifth order term we have $$k_1, k_2, k_3 = 3,1,1, \text{ or } 1,3,1, \text{ or } 1,1,3. \qquad (11')$$

and the resulting frequencies are $$[h_{11}f_1 + h_{12}f_1 + h_{13}f_1 + h_{21}f_2 + h_{31}f_3] \qquad (12')$$

together with similar terms obtained by permuting $f_1$, $f_2$ and $f_3$. The total number of distinct frequencies is 24 if $f_1$, $f_2$, $f_3$ are incommensurable. If $f_3$ is taken small, all of these may fall in the used band. However, by taking $f_3$ large enough all but a few may fall outside. Those which are inevitable in the numerical example discussed above are $$2000 - f_1$$
and
$$[2000 - 3f_1]$$

These are not very objectionable because they introduce no more frequencies than non-linearity in the circuit ahead of the modulator.

Similarly for the seventh order term $$k_1, k_2, k_3 = 5,1,1, \text{ or } 1,5,1, \text{ or } 1,1,5.$$
or
$$1,3,3, \text{ or } 3,1,3, \text{ or } 3,3,1. \qquad (11')$$

which leads to similar conclusions.

While the invention as described has related particularly to the use of third order modulators, the discussion just given shows how the principles of the balanced modulator may be extended to make use of the 5th or higher order portion of the characteristic of a non-linear device to yield other modulation and demodulation effects.

Earlier in the specification mention was made of the method to balance out first order components, and it was stated that this might be done by building out the elements to the same resistance value, either by the addition of resistance in series or resistance in parallel, the latter being the preferable method. In some cases, the non-linear elements may have terminal plates or conductors of appreciable area fairly close together which will constitute a capacity of sufficient magnitude to become of significance when dealing with high frequencies. These capacities would, of course, act as first order conductors and would be equivalent to a shunt capacity around the resistance element. In order to maintain balance then for high frequencies, it may sometimes be important that the capacity of each of the elements shall be the same, and this may be accomplished by shunting each element with a small capacity of such magnitude that each element will be brought to the same capacity. This feature of building out the elements, both by shunt resistance and shunt capacity, is shown in Fig. 3 in dotted lines, and it is to be understood that such building out elements would be attached to as many of the non-linear elements as may be required.

It will be seen that the third order modulator or demodulator described above adapts itself to a very large choice of results opening up possibilities in this direction which far surpass that of a second order modulator. Examples given are limited in number and are for illustrative purposes only, and it should now be clear to those skilled in the art that many variations on the combinations given are possible, and it is understood that these come within purview of my invention as defined in the claims.

What is claimed is:

1. A cubic modulator or demodulator circuit comprising a plurality of non-linear elements normally possessing first, second and third order terms, the method of eliminating the first and second order terms, which consists in bringing the elements to the same resistance value to eliminate the first order term and in so poling the elements as to eliminate the second order terms.

2. In an electric circuit a modulator unit of a third order comprising a plurality of non-linear impedance elements each possessing a third order component, the method of balancing out the first and even order terms, which consists in adjusting the elements to the same direct current resistance to balance the first order components and in directing the elements oppositely for the rectified components to balance out the even order terms.

3. In an electric circuit a modulator unit comprising a plurality of non-linear impedance elements each possessing a third order component, the method of balancing out the first and even order terms, which consists in building out the individual elements with series and with shunt resistance to the same direct current resistance value to balance out the first order components and in directing the elements oppositely for the rectified components to balance out the even order terms.

4. In a third order modulator or demodulator circuit a plurality of non-linear elements connected in parallel, each possessing a third order term and each adjusted to the same direct current resistance, means for impressing on each element a plurality of variable voltages to be modulated with respect to each other, means for impressing each voltage on each element in such a direction as to balance out undesired modulation components, and means for so poling the elements that second order terms balance out.

5. In a modulator or demodulator circuit having four branches in parallel, a non-linear resistance element of substantially cubic order in each branch, a plurality of voltages of different frequencies to be modulated with respect to each other, and means for impressing the voltages on the respective elements so that the undesired modulation terms will appear in mutually opposed phase relation and will balance out.

6. In a modulator or demodulator circuit two branches in parallel, a non-linear resistance element of substantially cubic order in each branch, three transformer windings in series in each branch, one winding of each branch together with a third outside winding constituting a transformer, means for impressing on each of the outside windings an alternating current voltage of frequencies to be modulated with respect to each other, a load connected electrically in series with the two branches of the circuit, the direction of connection of the transformer windings being made so that certain undesired modulation terms will appear in mutually opposed phase relation and will balance out and desired modulation terms will add up.

7. In a modulation or demodulation circuit four branches in parallel, a non-linear resistance element of substantially cubic order in each branch, four transformer windings in series in each branch, one winding of each branch together with a fifth outside winding constituting a transformer, means for impressing on three of the outside windings alternating current voltages of two or more different frequencies to be modulated with respect to each other, a load connected to the fourth outside winding, the direction of connection of the windings being made so that undesired modulation terms will appear in mutually opposed phase relation and will be balanced out.

8. The combination of claim 7 characterized by the fact that the transformers are so connected that all terms balance out except those which are the products of the three impressed voltages.

9. A modulator-demodulator circuit comprising a plurality of non-linear resistance elements of substantially cubic order, means for impressing on each of the elements three E. M. F.'s of different frequencies, and means for electrically associating the elements with each other and for applying the E. M. F.'s thereto in such manner as to balance out all components except that proportional to the product of all three impressed E. M. F.'s.

10. In a third order modulator or demodulator circuit a plurality of non-linear elements connected in parallel and each possessing a third order term, means for impressing on each element a plurality of variable voltages to be modulated with respect to each other, said means poling the impressed E. M. F.'s in such direction as to balance out all even order modulation terms and any undesired third order modulation components.

11. In an electric circuit a modulator unit of a third order comprising a plurality of non-linear impedance elements each possessing a third order component, the method of balancing out the first and even order terms, which consists in adjusting the elements to the same capacitance to balance the first order components and in directing the elements oppositely for the rectified components to balance out the even order terms.

12. In an electric circuit a modulator unit of a third order comprising a plurality of non-linear impedance elements each possessing a third order component, the method of balancing out the first and even order terms, which consists in adjusting the elements to the same capacitance and direct current resistance to balance the first order components and in directing the elements oppositely for the rectified components to balance out the even order terms.

HARRY NYQUIST.